United States Patent [19]

Tuminello et al.

[11] Patent Number: 6,034,170
[45] Date of Patent: Mar. 7, 2000

[54] SOLUTIONS OF FLUOROPOLYMERS IN CARBON DIOXIDE

[75] Inventors: William Howard Tuminello, Newark, Del.; Mark A. McHugh, Baltimore, Md.; Robert Clayton Wheland; Gregory Thomas Dee, both of Wilmington, Del.

[73] Assignees: E. I. du Pont de Nemours and Company, Wilmington, Del.; Johns Hopkins University, Baltimore, Md.

[21] Appl. No.: 09/170,549

[22] Filed: Oct. 13, 1998

Related U.S. Application Data

[60] Provisional application No. 60/062,276, Oct. 17, 1997.

[51] Int. Cl.$^7$ .......................................................... C08J 3/02
[52] U.S. Cl. ........................... 524/545; 524/424; 524/401; 524/544; 524/546; 526/942; 528/481
[58] Field of Search ...................................... 524/424, 544, 524/545, 546, 401; 528/481; 526/942

[56] References Cited

U.S. PATENT DOCUMENTS

| | | |
|---|---|---|
| 5,496,901 | 3/1996 | DeSimone . |
| 5,530,049 | 6/1996 | Dee et al. . |
| 5,618,894 | 4/1997 | DeSimone et al. . |

*Primary Examiner*—Fred Zitomer

[57] ABSTRACT

Fluoropolymers containing a specified ratio of hydrogen to fluorine atoms attached to polymer backbone atoms dissolve in carbon dioxide under relatively mild conditions of temperature and pressure. The resulting solutions may be used for coatings or encapsulation.

12 Claims, No Drawings

SOLUTIONS OF FLUOROPOLYMERS IN CARBON DIOXIDE

This application claims priority benefit of U.S. Provisional Application Ser. No. 60/062,276, filed Oct. 17, 1997.

FIELD OF THE INVENTION

Solutions of fluoropolymers in carbon dioxide are prepared and maintained under relatively low pressure and temperature conditions if the fluoropolymer has a specified ratio of hydrogen atoms to fluorine atoms attached to backbone carbon atoms.

TECHNICAL BACKGROUND

Fluoropolymers are important items of commerce being used in many applications. For some applications such as for making coatings or foams, sealing of porous substances and encapsulation it is desirable to dissolve the fluoropolymer in a solvent. However, many of the solvents for fluoropolymers have various drawbacks, such as being greenhouse gases, high flammability, toxicity, etc. Liquid or supercritical carbon dioxide is a relatively benign solvent which is known to dissolve some fluoropolymers. However typically these polymers have been/must be dissolved at relatively high temperatures and pressures. This necessitates the use of very expensive equipment and has limited the practical utility of $CO_2$ as a solvent.

U.S. Pat. No. 5,496,901 describes the "solution" polymerization of a wide variety of fluoropolymers in liquid or supercritical $CO_2$. No mention is made of dissolving the specific polymers used under the conditions described herein.

U.S. Pat. No. 5,530,049 describes the dissolution of high melting point fluoropolymers at temperatures and pressures higher than used herein.

U.S. Pat. No. 5,618,894 describes a process for making fluoropolymers with stable end groups in the presence of liquid or supercritical carbon dioxide. No mention is made of criteria for polymer solubility in $CO_2$.

SUMMARY OF THE INVENTION

This invention concerns a composition, comprising, a solution in liquid or supercritical carbon dioxide of a fluoropolymer, wherein said fluoropolymer:

has a ratio of backbone hydrogen:fluorine atoms of about 0.3 to about 1.0;

has a melting point, if any, of about 100° C. or less;

contains only carbon, hydrogen, fluorine, and optionally ether oxygen; and has a weight average molecular weight of about 5,000 or more.

This invention also concerns a process for making a solution of a fluoropolymer in carbon dioxide, comprising, contacting liquid or supercritical carbon dioxide with said fluoropolymer at a temperature of about 100° C. or less and a pressure of about 41 MPa (6,000 psi) or less, wherein said fluoropolymer:

has a ratio of backbone hydrogen:fluorine atoms of about 0.3 to about 1.0;

has a melting point, if any, of about 100° C. or less;

contains only carbon, hydrogen, fluorine, and optionally ether oxygen; and has a weight average molecular weight of about 5,000 or more.

DETAILS OF THE INVENTION

The fluoropolymers described herein may be dissolved in any proportion in $CO_2$, but a preferred concentration of polymer in the solution is less than about 70 weight percent, based on the total weights of polymer and $CO_2$ present The $CO_2$ may be in the liquid or supercritical state. By supercritical herein is meant the temperature is above the critical temperature for $CO_2$, 31° C.

The temperature at which the fluoropolymer is dissolved is about 100° C., or less, preferably about 50° C., or less, and more preferably about 30° C., or less. A preferred minimum temperature is about −20° C. Generally speaking the higher the temperature used the higher the $CO_2$ pressure needed. However, higher temperatures may be needed if the fluoropolymer has a melting point above room temperature (about 25° C.), or the backbone hydrogen atom content of the polymer is relatively low.

While dissolving the fluoropolymer, it is desirable to agitate the mixture to speed dissolution of the fluoropolymer.

The fluoropolymer to be dissolved in $CO_2$ has certain attributes. It has a weight average molecular weight of about 5,000 or more, preferably about 10,000 or more. The weight average molecular weight is determined by gel permeation chromatography using appropriate absolute standards.

The fluoropolymer has a melting point, if one is present at all, of about 100° C. or less, preferably about 50° C. or less, and more preferably no melting point above 0° C. More preferably there is no melting point at or above the temperature at which the fluoropolymer is dissolved. The melting point is measured by differential scanning calorimetry (DSC) at a heating rate of 20° C. per minute. Any melting point associated with an endotherm heat of melting of 2 J/g or more is considered a melting point for purposes herein. By the melting point (temperature) is meant the end of melting point, where the melting endotherm rejoins the base line in the DSC trace.

The fluoropolymer may contain only carbon, hydrogen, fluorine and oxygen in the form of ether groups. Trace amounts of other elements from impurities or degradation products may also be present.

The fluoropolymer must also have a specified ratio of backbone hydrogen:fluorine atoms (H/F ratio). By backbone hydrogen and fluorine atoms are meant hydrogen and fluorine atoms that are bound directly to carbon atoms of the main chain of the fluoropolymer. Hydrogen and fluorine atoms on side chains are not included in the H/F ratio. Each repeat unit derived from any particular monomer will contribute a certain number of hydrogen and/or fluorine atoms to the population of backbone hydrogen and fluorine atoms. Some examples are given in Table 1.

TABLE 1

| Monomer | Repeat Unit | Number of Fluorines[a] | Number of Hydrogens[a] |
| --- | --- | --- | --- |
| Tetrafluoroethylene | —$CF_2CF_2$— | 4 | 0 |
| Vinylidene fluoride | —$CF_2CH_2$— | 2 | 2 |
| Vinyl fluoride | —$CFHCH_2$— | 1 | 3 |
| Perfluoro(methyl vinyl ether) | —$CF_2CF(OCF_3)$— | 3 | 0 |
| Vinyl trifluoromethyl ether | —$CH_2CH(OCF_3)$— | 0 | 3 |
| Hexafluoropropylene | —$CF_2CF(CF_3)$— | 3 | 0 |

TABLE 1-continued

| Monomer | Repeat Unit | Number of Fluorines[a] | Number of Hydrogens[a] |
|---|---|---|---|
| Ethylene | —CH₂CH₂— | 0 | 4 |
| Methyl trifluorovinyl ether | —CF₂CF(OCH₃)— | 3 | 0 |
| 2,2,2-trifluoroethyl acrylate | —CH₂CH(CO₂CH₂CF₃)— | 0 | 3 |

[a]Backbone atoms only

The contribution of any particular repeat unit of H and/or F backbone atoms to the H/F ratio will also be dependent on the proportion of that particular repeat unit in the polymer. Examples of actual H/F ratios will be found in the Examples. It is preferred that the H/F ratio is about 0.4 to about 0.8.

In the fluoropolymer, preferred monomers (and their corresponding repeat units) are tetrafluoroethylene (TFE), hexafluoropropylene (HFP), vinylidene fluoride (VF2), vinyl fluoride (VF), ethylene (E), propylene (P), perfluoro (methyl vinyl ether), perfluoro(ethyl vinyl ether), perfluoro (propyl vinyl ether), and methyl vinyl ether. Obviously, in order to form fluoropolymers with the correct H/F ratio, some of these monomers must be present in copolymers. Especially preferred polymers contain one or more of TFE, HFP and/or VF2, and optionally other monomers. Specific preferred copolymers are TFE/VF2, HFP/VF2, TFE/HFP/VF2, TFE/HFP/E, TFE/HFP/VF and TFE/HFP/P.

In the Examples:

all pressures are gauge pressures;

none of the polymers had a melting point above 20° C.;

and with the exception of Example 7 all of the polymers had an Mw of 9,000 or more as indicated by a molecular weight measurement or by their solution viscosity.

The following abbreviations are used in the Examples:

E—ethylene
HFP—hexafluoropropylene
IV—inherent viscosity
Mw—weight average molecular weight
P—propylene
TFE—tetrafluoroethylene
VF—vinyl fluoride
VF2—vinylidene fluoride

EXAMPLES 1–7 AND COMPARATIVE EXAMPLE A

A pressure cell as described in W. H. Tuminello, D. J. Brill, D. J. Walsh and M. E. Paulaitis, *J. Appl. Polym. Sci.*, 56, 495 (1995), which is hereby included by reference, was used. The total volume of the cell is about 3.0 ml. Polymer sufficient to make a 17 volume percent solution was added to the cell first. This polymer concentration was used to allow a good estimate of interaction with $CO_2$ by observing swelling, coalescence, and flowability of the polymer-rich phase. A vacuum was applied for a few minutes and then liquid $CO_2$ was added until the cell was filled at its vapor pressure, about 6.2 MPa (900 psi). Pressures could be increased to as high as 31.7 MPa (4600 psi) by pushing a piston through a manifold loaded with $CO_2$. Temperature was increased to as high as 100° C. with an electrical heating band around the pressure chamber. Temperatures as low as about –10° C. were achieved by removing the heating band and packing dry ice around the cell. Solubility was observed visually through sapphire windows.

A cloud point was measured at constant temperature with decreasing pressure and is defined as that pressure at which the mixture becomes so opaque that it is no longer possible to see the stirring paddle inside the cell.

Table 2 lists the compositions of the polymers, their inherent viscosities or molecular weights and backbone H/F ratios. With the exceptions of Example 1 and Comparative Example A, all of the polymers formed solutions under the conditions shown. In Comparative Example A, at the conditions shown, a polymer rich phase took up about 30 volume percent of the cell, which corresponds to about a 56 weight percent of polymer solution. In Example 1 the polymer rich phase occupied ½ to ⅔ of the sample chamber volume after about a day.

TABLE 2

| Ex. No. | Polymer Composition (mole percent) | IV or Mw | H/F Ratio | Pressure MPa | Temp. °C. |
|---|---|---|---|---|---|
| A | TFE(44)/HFP(41)/E(15) | Mw = 62,000 | 0.201 | 27.6 | 25 |
| 1 | TFE(19)/HFP(37)/VF2(44) | IV = 0.36[a] | 0.320 | 27.6 | 25 |
| 2 | HFP(50)/VF2(50) | IV = 0.29[a] | 0.400 | 31.0 | 22 |
| 3 | HFP(43)/VF2(57) | IV = 1.26[b] | 0.469 | 31.0 | 22 |
| 4 | TFE(35)/HFP(32)/E(33) | IV = 0.44[a] | 0.559 | 22.1 | 18 |
| 5 | TFE(25)/HFP(35)/E(40) | IV = 0.44[a] | 0.744 | 26.2 | 40 |
|   |   |   |   | 12.1 | 6 |
| 6 | TFE(19)/HFP(36)/VF(45) | Mw = 1,500,000 | 0.590 | 23.4 | 25 |
|   |   |   |   | 13.1 | 0 |
| 7 | TFE(36)/HFP(36)/P(28)[c] | Mw = 9,400 | 0.389 | 9.7 | 25 |

[a]Measured at 25 °C. in n-2,3-H-perfluoropentane at a concentration of 0.1 g/10 ml
[b]Measured at 25 °C. in acetone at a concentration of 0.1 g/10 ml
[c]Approximate composition Cloud points are given below in Table 3 for Example 2, and in Table 4 for Example 7.

TABLE 3

| Heating | | Cooling | |
|---|---|---|---|
| Temp. °C. | Pressure MPa | Temp. °C. | Pressure MPa |
| 26.4 | 28.6 | –6.0 | 19.3 |
| 26.5 | 28.8 | –6.5 | 19.2 |
| 23.8 | 28.0 | –1.0 | 20.7 |
| 23.5 | 28.0 | 4.0 | 22.5 |
| 22.0 | 27.1 | 6.7 | 23.2 |
| 20.2 | 26.7 | 9.2 | 24.3 |
| 18.6 | 26.1 | 14.2 | 25.9 |
| 17.4 | 25.6 | 17.2 | 26.8 |
| 15.4 | 25.1 | | |
| 13.8 | 24.7 | | |
| 11.8 | 24.1 | | |
| 9.8 | 23.4 | | |
| 8.0 | 22.7 | | |
| 4.0 | 21.9 | | |
| 1.8 | 20.7 | | |
| 0.0 | 20.6 | | |
| –2.6 | 20.0 | | |
| –3.2 | 19.9 | | |
| –4.5 | 19.6 | | |

TABLE 4

| Temp. °C. | Pressure MPa |
|---|---|
| 21.8 | 7.79 |
| 25.7 | 9.86 |
| 28.8 | 10.9 |
| 31.2 | 11.4 |

TABLE 4-continued

| Temp. °C. | Pressure MPa |
|---|---|
| 34.2 | 12.7 |
| 37.6 | 13.5 |
| 41.6 | 15.2 |
| 46.4 | 16.7 |
| 48.2 | 17.5 |

What is claimed is:

1. A composition, comprising, a solution in liquid or supercritical carbon dioxide of a fluoropolymer, wherein said fluoropolymer:

has a ratio of backbone hydrogen:fluorine atoms of about 0.3 to about 1.0;

has a melting point, if any, of about 100° C. or less;

contains only carbon, hydrogen, fluorine, and optionally ether oxygen; and has a weight average molecular weight of about 5,000 or more.

2. The composition as recited in claim 1 wherein said fluoropolymer has a weight average molecular weight of about 10,000 or more.

3. The composition as recited in claim 1 wherein said fluoropolymer contains repeat units derived from one or more of tetrafluoroethylene, hexafluoropropylene and vinylidene fluoride.

4. The composition as recited in claim 1 wherein said fluoropolymer has no melting point above 0° C.

5. The composition as recited in claim 4 wherein said fluoropolymer is a copolymer of tetrafluoroethylene and vinylidene fluoride; hexafluoropropylene and vinylidene fluoride; tetrafluoroethylene, hexafluoropropylene and vinylidene fluoride; tetrafluoroethylene, hexafluoropropylene and ethylene; tetrafluoro-ethylene, hexafluoropropylene and vinyl fluoride; or tetrafluoroethylene, hexafluoropropylene and propylene.

6. A process for making a solution of a fluoropolymer in carbon dioxide, comprising, contacting liquid or supercritical carbon dioxide with said fluoropolymer at a temperature of about 100° C. or less and a pressure of about 41 MPa (6,000 psi) or less, wherein said fluoropolymer:

has a ratio of backbone hydrogen:fluorine atoms of about 0.3 to about 1.0, has a melting point, if any, of about 100° C. or less;

contains only carbon, hydrogen, fluorine, and optionally ether oxygen; and has a weight average molecular weight of about 5,000 or more.

7. The process as recited in claim 6 wherein said fluoropolymer has a weight average molecular weight of about 10,000 or more.

8. The process as recited in claim 6 wherein said fluoropolymer contains repeat units derived from one or more of tetrafluoroethylene, hexafluoropropylene and vinylidene fluoride.

9. The process as recited in claim 6 wherein said fluoropolymer has no melting point above 0° C.

10. The process as recited in claim 9 wherein said fluoropolymer is a copolymer of tetrafluoroethylene and vinylidene fluoride; hexafluoropropylene and vinylidene fluoride; tetrafluoroethylene, hexafluoropropylene and vinylidene fluoride; tetrafluoroethylene, hexafluoropropylene and ethylene; tetrafluoro-ethylene, hexafluoropropylene and vinyl fluoride; or tetrafluoroethylene, hexafluoropropylene and propylene.

11. The process as recited in claim 6 wherein said temperature is about 50° C. or less.

12. The process as recited in claim 6 wherein said pressure is about 31 MPa or less.

* * * * *